Figure 3:
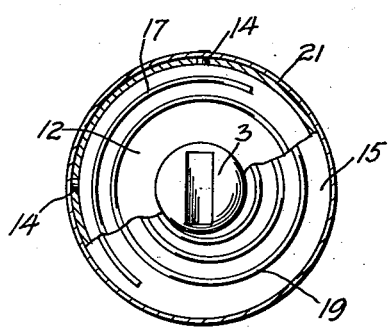

Dec. 26, 1939.    L. SHUMAN    2,184,683
BRAKE MECHANISM
Filed Dec. 2, 1938

INVENTOR:
LEWIS SHUMAN
BY
O O Martin
ATTORNEY.

Patented Dec. 26, 1939

2,184,683

UNITED STATES PATENT OFFICE 2,184,683

BRAKE MECHANISM

Lewis Shuman, Los Angeles, Calif.

Application December 2, 1938, Serial No. 243,552

6 Claims. (Cl. 188—79.5)

The present invention relates to hydraulic brake mechanisms for automotive vehicles and refers particularly to means automatically maintaining such mechanisms properly adjusted in order that the brakes may continue to function satisfactorily until the brake lining is all used up.

The object of the invention is to provide a simple and inexpensive device of the character set forth for use in connection with the hydraulic brakes ordinarily installed in automobiles at the present day. The preferred form of the invention is illustrated in the appended drawing and hereinafter fully described in detail.

Figure 2:
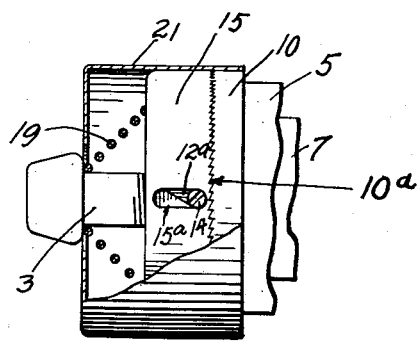
Figure 1:
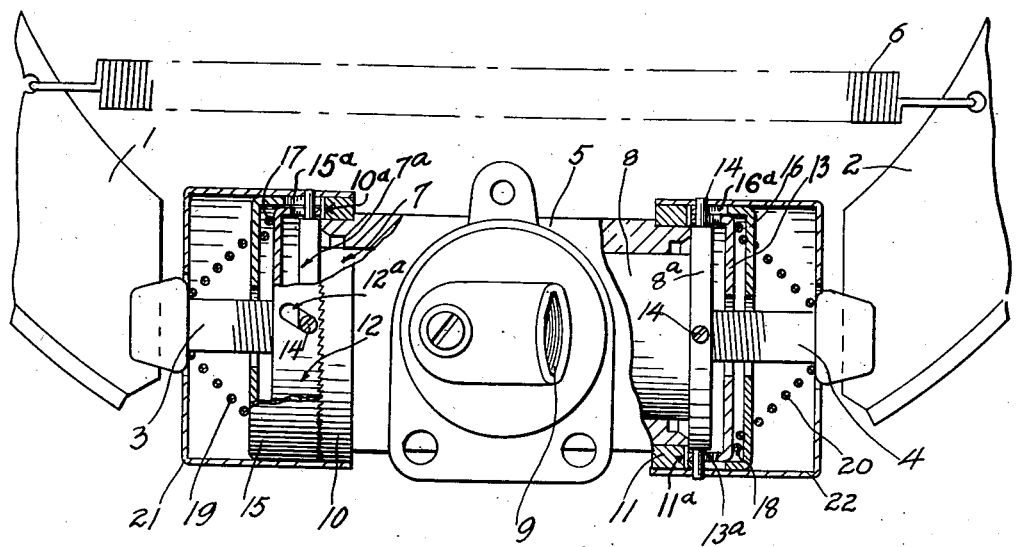

In the drawing:

Fig. 1 is a side elevation partly in section of the device of the invention as applied to the brake shoes of an automobile brake mechanism, Fig. 2 illustrates one end of the device of Fig. 1 with parts broken away for the sake of clearness, Fig. 3 is an end view of the device of the invention and it is shown partly in section in order better to disclose some of the interior mechanism.

The device of the invention is, in Fig. 1, shown applied to a commercially well known and widely used type of hydraulic brake mechanism including brake shoes 1 and 2. On account of the limited space, the major portion of these shoes is broken away, but it is well known in the art that they are, at the top, pivotally joined together, and they are shown urged toward each other by a suitable powerful spring 6.

The lower extremities of the shoes ride in slots in the heads of a pair of screws 3, 4, which form part of the hydraulic cylinder mechanism 5. Pistons 7, 8 are fitted to slide within this cylinder, and these pistons have threaded sockets in which the screws are seated. The fluid used to set the brakes is forced through an inlet 9 into the space between these pistons, thereby to cause the latter to separate and to force the brake shoes against the brake drums (not shown). All of the foregoing describes substantially parts of the ordinary hydraulic brake mechanism used in modern motor cars.

The body of the cylinder 5 is at both ends shown made with an annular recess in which annular members 10, 11 are rigidly secured and these members are on their faces provided with ratchet teeth 10ª, 11ª. The pistons are made with flanges 7ª, 8ª, on which thimbles 12, 13 are fitted to slide axially, and these thimbles have each a series of diagonal slots 12ª, 13ª, in which studs 14, of the piston flanges, are shown seated.

A second pair of thimbles 15, 16 fit loosely over the first named thimbles, and they are made with axially directed slots 15ª, 16ª, through which said studs also extend. Helical springs 17, 18 are shown placed between the thimbles of the two sets, and a second set of helical springs 19, 20 are placed between the heads of the screws 3, 4 and the outer faces of the outer thimbles 15, 16. In the inner faces of the rims of all the thimbles are cut ratchet teeth to mesh with the ratchet teeth of the cylinder ends.

In operation, the spring 6 urges the brake shoes to press the screws 3, 4 and the pistons 7, 8 inward. The springs 17, 18 urge the teeth of the inner thimble into engagement with the ratchet teeth of the cylinder, and the springs 19, 20 urge the teeth of the outer thimble into mesh with the same ratchet teeth. As a consequence, it is seen that the parts normally are all yieldingly locked together in fixed, inner position.

If now fluid is forced into the cylinder to move the pistons apart and thereby to set the brakes, it is seen that the studs 14 move outward with the pistons and press against the inclined sides of the thimble slots 12ª, 13ª. Outward movement of these thimbles is, however, resisted by the springs 17, 18, with the result that the thimbles become rotated slightly. This movement is so slight that these thimbles drop back into their initial positions when the fluid pressure is relieved until such a time that gradual wear of the brake shoe lining increases the axial movement of the pistons and in turn rotates these thimbles sufficiently to cause the teeth of the latter to jump one tooth in the ratchet teeth of the cylinder. It is seen that the ratchet teeth of the thimbles ride along the inclined backs of the cylinder teeth during these rotations, thereby to impart axial movement to the thimbles, which movement in turn compresses the springs 17, 18 sufficiently to move the thimbles 15, 16 outward, against the tension of the springs 19, 20. From this, it is seen, that the two sets of thimbles move together axially, and it is found that they are all moved clear of the cylinder teeth when the inner thimbles rotate sufficiently to jump a tooth. When thereupon the fluid pressure is relieved to permit the pistons again to recede, it follows that a slight rotation is imparted to the latter because the inner thimbles cannot move back into their original positions. Because the screws 3, 4 are seated in the screw-threads of the pistons, it is seen that these screws are moved slightly axially in response to this piston rotation.

It is, of course, necessary to have the ratchet teeth and the screw threads correctly directed to move the screws apart axially each time a ratchet tooth jump occurs, thereby to swing the brake shoes apart slightly and so automatically to readjust the shoes to compensate for wear thereon.

While the mechanism of the invention is mostly enclosed, it is well to provide caps 21, 22 to cover all except the heads of the screws. While the foregoing describes the preferred form of the invention, I reserve the right to effect such modifications as may come within the scope of the appended claims.

I claim:

1. In a hydraulic brake mechanism including brake shoes and spring pressure urging them together, the combination with a cylinder, of pistons seated in the ends thereof for axial movement therein, screws seated in threads of said pistons and made with slots enclosing the free ends of said shoes, inner thimbles axially slidable on the outer ends of said pistons and having diagonal slots, outer thimbles axially slidable on said inner thimbles and made with axial slots, studs in the periphery of said pistons seated in all of said slots, the thimbles and the ends of said cylinder having interengaging ratchet teeth, and means yieldingly pressing said thimble teeth into the teeth on the cylinder ends.

2. In a hydraulic brake mechanism including brake shoes and spring pressure urging said shoes together, the combination with a cylinder having ratchet teeth on its end faces, of pistons movable therein, axially adjustable means between said pistons and the said brake shoes, and means for automatically changing the adjustment of said means in response to brake shoe lining wear, said automatic means comprising thimbles axially slidable on said pistons and having ratchet teeth engaging the ratchet teeth of said cylinder.

3. In a hydraulic brake mechanism including brake shoes and spring pressure urging said shoes together, the combination with a cylinder having ratchet teeth on its end faces, of pistons movable therein, axially adjustable means between said pistons and the said brake shoes, and means for automatically changing the adjustment of said means in response to brake shoe lining wear, said automatic means comprising thimbles axially slidable on said pistons and having ratchet teeth engaging the ratchet teeth of said cylinder, and means yieldingly pressing said thimbles against the ends of said cylinder to maintain said ratchet teeth interengaged.

4. In a hydraulic brake mechanism including brake shoes and spring pressure urging said shoes together, the combination with a cylinder having ratchet teeth on its end faces, of pistons movable therein, members seated in threads of said pistons and held non-rotatable by said brake shoes, thimbles axially slidable on said pistons, said thimbles having ratchet teeth cut into their rim faces, means yieldingly seating said thimble teeth in the cylinder teeth, and means operatively interconnecting the thimbles with the pistons to translate axial movement of these parts into rotatory movement of the pistons, thereby to change the positions of the latter relative to the said members.

5. In a hydraulic brake mechanism including brake shoes and spring pressure urging said shoes together, the combination with a cylinder having ratchet teeth on its end faces, a piston axially slidable in each end thereof, a member threaded into each piston and held non-rotatable by said brake shoes, a thimble slidable on each piston, a second thimble slidable on the first thimble, said thimbles having ratchet teeth cut into their rim faces, means yieldingly seating the thimble teeth in said cylinder teeth, and means on each piston engaging said thimbles to impart rotation of one thimble relative to the other in response to outward axial movement thereof, said relative thimble movement resulting in piston rotation to change the piston position relative to said member.

6. In a brake mechanism, the combination with brake shoes and means urging said shoes together, of a cylinder having teeth cut into one end thereof, a piston movable in said cylinder to set the brake, a member threaded into said cylinder and held non-rotatable by one of the brake shoes, a thimble slidable on said cylinder, a second thimble slidable on the first thimble, said thimbles having teeth cut into their rim faces to engage said cylinder teeth, means yieldingly maintaining said thimbles pressed against the cylinder end, and means operatively interconnecting the thimbles and piston to impart relative rotations of one thimble and the piston to the other thimble in response to axial movements thereof.

LEWIS SHUMAN.